United States Patent [19]

McGee

[11] 4,245,662
[45] Jan. 20, 1981

[54] HEAT RESPONSIVE BACK SEAT ARRANGEMENT FOR VALVE OPERATOR WITH FUSIBLE LOCK-OUT CAP

[75] Inventor: John K. McGee, Houston, Tex.

[73] Assignee: Combustion Engineering, Inc., Windsor, Conn.

[21] Appl. No.: 955,231

[22] Filed: Oct. 27, 1978

[51] Int. Cl.³ .............................................. F16K 17/38
[52] U.S. Cl. ......................................... 137/75; 92/23; 137/553
[58] Field of Search ............................ 137/67, 72–77; 169/19, 42, 57; 122/504.1, 504.3; 92/23

[56] References Cited

U.S. PATENT DOCUMENTS

| | | | |
|---|---|---|---|
| 3,659,624 | 5/1972 | Kelly et al. | 137/75 |
| 3,838,705 | 10/1974 | Diehl et al. | 137/75 |
| 3,842,853 | 10/1974 | Kelly et al. | 137/75 |
| 3,958,592 | 5/1976 | Wells et al. | 137/77 X |

Primary Examiner—Martin P. Schwadron
Assistant Examiner—Richard Gerard
Attorney, Agent, or Firm—Cushman, Darby & Cushman

[57] ABSTRACT

A valve operator for a normally open valve is maintained in a cocked, ready to close mode by an arrangement which includes a radially contracted, self-expansible split retainer ring backed by a body of fusible material. Should the vicinity of the associated valve be subjected to the heat of a fire, the fusible body will melt out of blocking relation, permitting the split ring to expand free of the operator stem. A cocked spring recovers, axially moving the stem both to shut the valve and to engage a metal-to-metal back seat between the valve stem and valve bonnet. The latter event ensures against leakage even if the fire or wear has ruined the integrity of the usual valve stem packing.

11 Claims, 3 Drawing Figures

HEAT RESPONSIVE BACK SEAT ARRANGEMENT FOR VALVE OPERATOR WITH FUSIBLE LOCK-OUT CAP

BACKGROUND OF THE INVENTION

The present invention was made as a further development of the valve shown and described in the copending U.S. Pat. application of McGee, Ser. No. 800,437, filed May 25, 1977, now U.S. Pat. No. 4,138,091 for a drive nut plate assembly for the valve, and the copending U.S. Pat. application of McGee, et al, Ser. No. 800,438, filed May 25, 1977, now U.S. Pat. No. 4,149,558 for a selective back seat for the valve. A parallel development is disclosed in the copending U.S. Pat. application of McGee, Ser. No. 955,232 filed Oct. 27, 1978. This latter application describes a valve operator that is provided with a back seat which comes into use when the normally non-rising stem operator and its bearing-enclosing bonnet gland are raised, e.g. so that stem packing can be replaced, and is further provided with another way to actuate the back seat, one which will come into play should the valve be subjected to heat of sufficient intensity as to call the integrity of the stem packing or other critical parts into question. The further activation mode depends on the melting of fusible material which permits the operator and its bearings to rise relative to the bonnet.

All the foregoing, in turn, represent developments of valves described in the following prior U.S. patents.

| Patentee | U.S. Pat. No. | Issue Date |
|---|---|---|
| Crain, et al | 3,349,789 | Oct. 31, 1967 |
| McGee | 3,789,875 | Feb. 5, 1974 |
| Boitnott | 3,990,679 | Nov. 9, 1976 |

Others have worked with fusible materials in order to provide safety devices for valves. Examples are shown in the following prior U.S. patents:

| Patentee | U.S. Pat. No. | Issue Date |
|---|---|---|
| Wicke | 3,771,540 | Nov. 13, 1973 |
| Allen | 3,788,600 | Jan. 29, 1974 |
| Wicke | 3,842,854 | Oct. 22, 1974 |
| Wicke | 3,896,835 | July 29, 1975 |

SUMMARY OF THE INVENTION

A valve operator for a normally open valve is maintained in a cocked, ready to close mode by an arrangement which includes a radially contracted, self-expansible split retainer ring backed by a body of fusible material. Should the vicinity of the associated valve be subjected to the heat of a fire, the fusible body will melt out of blocking relation, permitting the split ring to expand free of the operator stem. A cocked spring recovers, axially moving the stem both to shut the valve and to engage a metal-to-metal back seat between the valve stem and valve bonnet. The latter event ensures against leakage even if the fire or wear has ruined the integrity of the usual valve stem packing.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION OF THE PRESENTLY PREFERRED EMBODIMENT

Figure 1A:
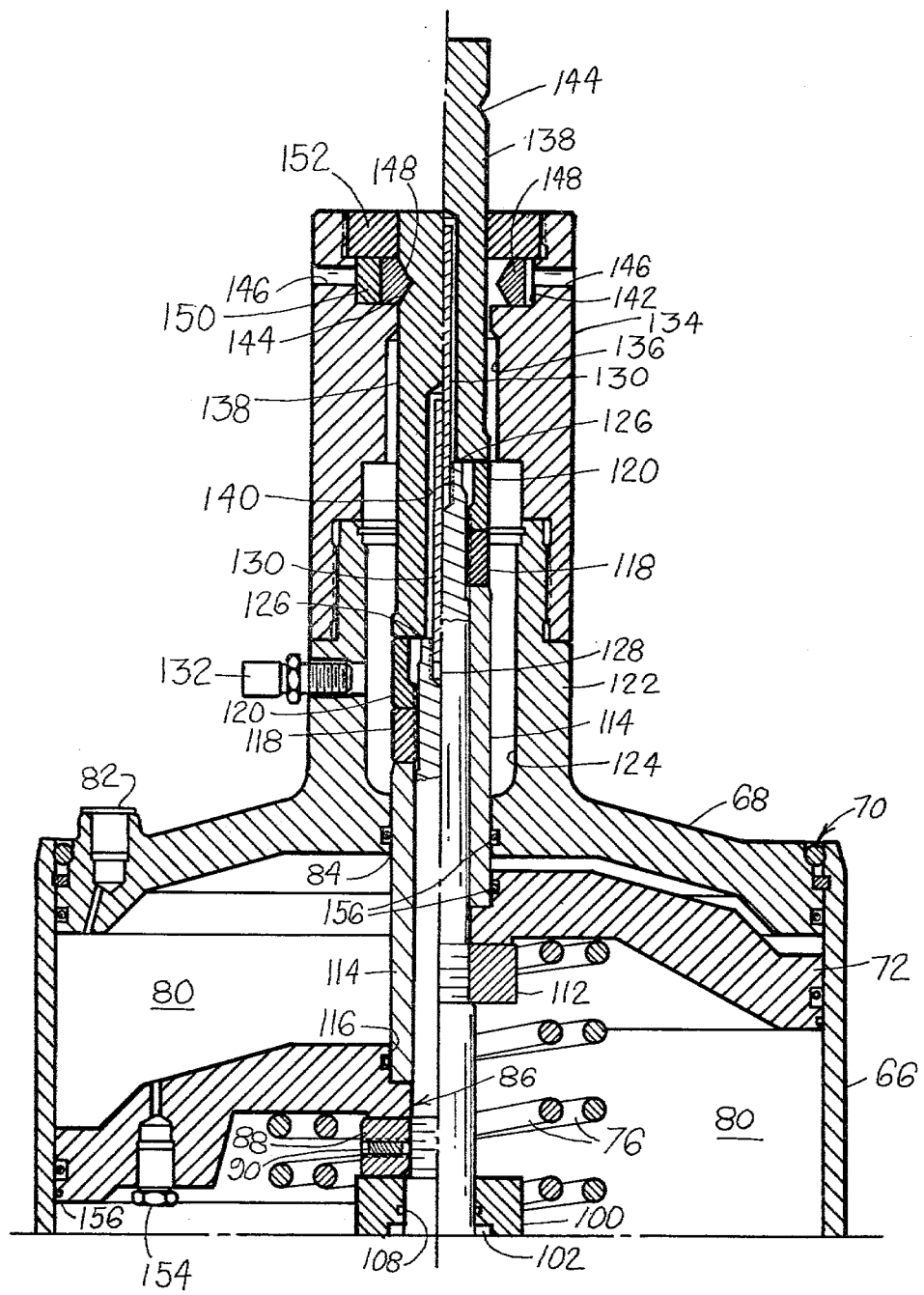
FIGS. 1a and 1b are, respectively, the upper and lower sections of a single a fragmentary vertical longitudinal sectional view of a gate valve provided with the heat responsive back seat arrangement of the invention. To the right of its center line the valve gate is shown in a raised, closed condition and to the left the valve gate is shown in a lowered, open condition.

In the figures, there is shown a gate valve 10 having a housing 12 which includes a body 14. The body has a longitudinal throughbore 16 to provide a flow passageway. At the ends of the bore 16, the body is provided with flanges 18 wherewith the valve may be connected in a conduit to provide means for controlling fluid flow through the conduit.

Intermediate the ends of the bore 16 there is provided a valve chamber 20 which includes a transverse passageway which intersects with the bore 16 and opens outwardly through the body at a tubular boss 22. The boss 22 is provided with a flat outer end surface 24.

The housing 12 further includes a valve bonnet 26 that is mated with the surface 24 and secured to the body, e.g. by bolts 28. A sealing ring 30 is interposed between the body and bonnet to provide sealed integrity for this juncture.

The bonnet 26 is an annular or tubular element, in the sense that it has a coaxially disposed bore 32.

Within the chamber 20, valve seats 34 are provided at the intersections with the throughbore 16, and a valve gate 36 is received for sliding transversally of the throughbore 16. The gate 36 is shown including a pair of gate plates 38, and the valve is shown including an expander 40 which serves to force the plates against the seats 34 when the valve is closed, and to withdraw that force as the gate is opened.

Figure 1B:
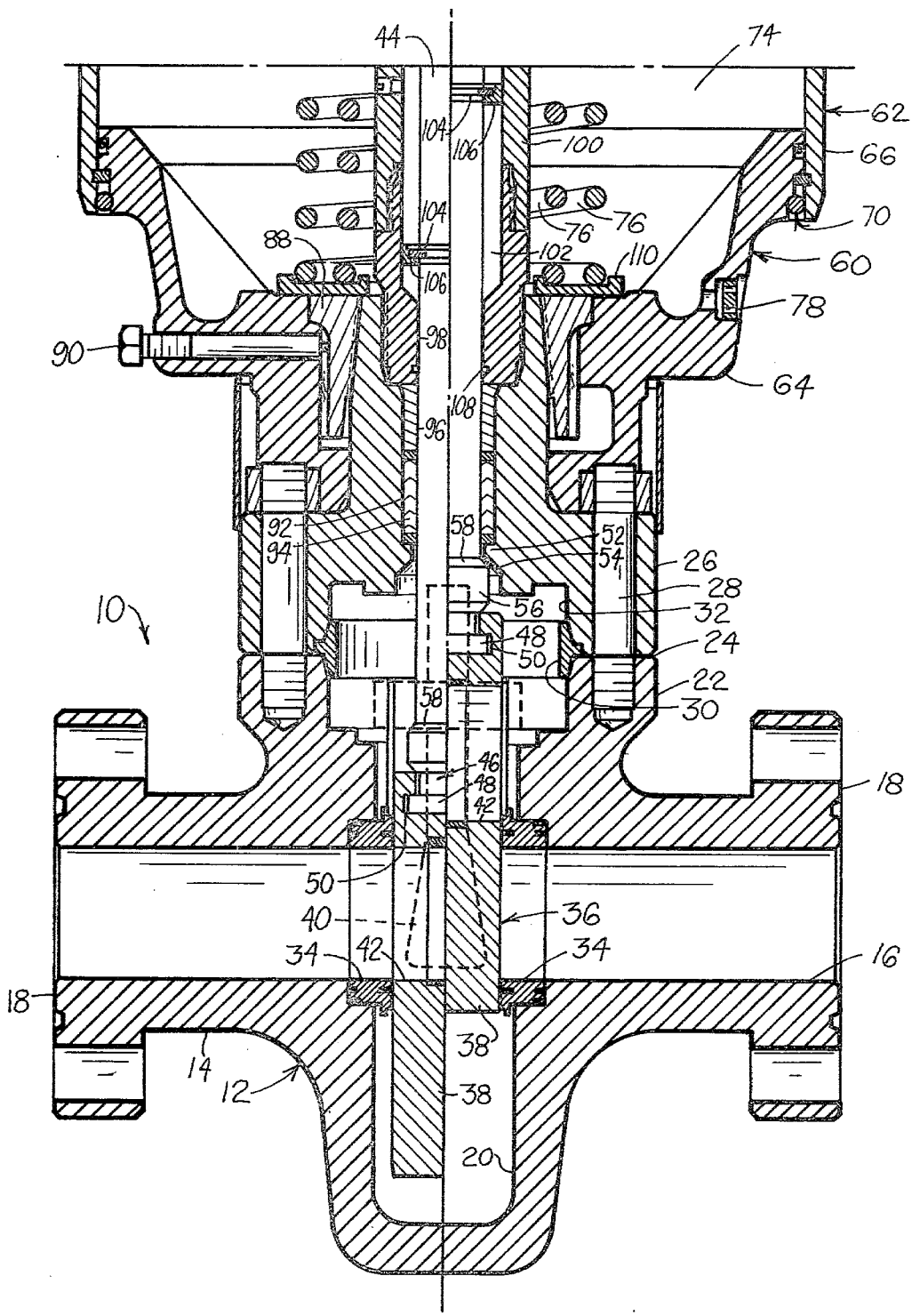

In FIG. 1b the gate is shown in its normal, lowered open position at the left, and in its usual, raised closed position at the right. When the gate is open, the openings 42 through the respective gate plates are both axially aligned with the valve body throughbore 16. When the gate is closed, the blank regions of the respective gate plates are pressed against the respective valve seats 34.

In the design of valve shown in FIGS. 1a and 1b, the gate is moved between its open and closed position by means of a nonrotating, rising stem 44 which is connected to the gate 36 at 46. As shown, the connection 46 takes the form of a flange 48 on the lower end of the valve stem 44 which is received in a radially undercut well 50 formed by complementary recesses in the upper ends of the gate plates 38. The valve stem 44 extends coaxially out through the bore 32 of the valve bonnet 26.

The valve bonnet 26 within the bore 32 thereof, is provided with a circumferentially extending radial constriction which has a frusto-conically curved axially downwardly and radially inwardly facing sealing surface 54 coaxially provided thereon. Near the lower end thereof, the valve stem 44 is provided with a circumferential enlargement 56, the axially upper end of which is provided with a frusto-conical sealing surface 58 designed to form an extensive surface to surface sealing engagement with the sealing surface 54 when the valve stem 44 is raised sufficiently (see the right half of FIGS. 1a and 1b).

In FIGS. 1a and 1b the valve 10 is shown provided with a fluid pressure actuated operator 60. This may be of a type known in the art. Its basic purpose in the context of the present invention is to provide a means for storing energy in order to permit closure of the valve under an emergency condition. The fluid pressure actuated operator 60 which is shown is one up-dated version of the one which is shown in the aforementioned U.S. patent of Mcgee, U.S. Pat. No. 3,789,875. Interested readers are referred to that patent for a more extensive discussion of the details of its operation. Although similar operators are available which use a liquid such as hydraulic fluid as the working fluid, the particular fluid pressure actuated operator shown in FIGS. 1a and 1b is one designed to use compressed air or other compressed gas as a working fluid. However, either sort could be used in the context of the present invention.

What follows is a brief general discussion of the parts of the operator 60.

The operator 60 includes a housing 62 which has a generally upwardly concave annular bottom wall member 64, a generally cylindrical, tubular side wall 66 and a generally downwardly concave annular top wall 68. In order to permit assembly and disassembly, the parts 64, 66 and 68 are separate parts which are removably secured and sealed together at 70.

Within the housing, an annular piston 72 is slidingly receive and divides the interior of the housing into two compartments. The lower compartment 74 coaxially receives compression coil springs 76 which are interposed axially between the piston 72 and the bottom wall 64 and gain purchase thereagainst. The lower compartment 74 is vented to the exterior of the housing 62 at 78. The upper compartment 80 is provided with a pressurized fluid inlet fitting 82.

The operator 60 is mounted on the upper end of the valve bonnet 26 so that the valve stem 44 passes coaxially up through the compartment 74 and 80 and coaxially out through an opening 84 formed in the upper end wall 68. Within the housing, the valve stem 44 passes coaxially through the piston 72 and is connected thereto at 86.

As shown, the tubular upper end of the bonnet 26 is both internally and externally threaded. Mounting of the bottom end wall 64 of the housing 62 on the valve bonnet 26 involves depositing the bottom end wall 64 in place and threading in the hold down nut 88. A lock screw 90 is threaded into place in order to prevent unwanted backing out of the hold down nut 88.

Within the bore 32 of the valve bonnet 26, above the radial constriction 52 the annular space 92 forms a chamber for a conventional packing set 94. The packing set 94 may, for instance, be comprised of a stack of chevron shaped packing rings with suitable terminating rings at the upper and lower ends of the stack. After the packing set 94 has been installed in the packing chamber 92 a junk ring 96 is installed behind the packing set. A packing nut 98 is screwed into the upper end of the bore 32 behind the junk ring 96 in order to seat the junk ring, thereby axially shortening and radially expanding the packing set 94 in order to form a working seal between the outside of the valve stem 44 and the inside of the valve bonnet 26. An inverted cup-shaped, annular member 100 is slipped down over the stem 44 and threaded into the upper end of the packing nut 98. These two members between them define a cushion chamber 102 internally thereof, surrounding the valve stem 44. Within this chamber a retainer 104 mounts a piston cushion 106 at a fixed location on the valve stem 44. The cushion chamber is sealed with respect to the valve stem at each end of the cushion chamber at 108.

An annular bridge plate 110 is provided resting on the bottom end wall 64. The lower ends of the compression coil springs 76 are supported in turn on the bridge plate 110.

Item 112 is a stop nut threaded onto the threaded band on the valve stem 44 and stopped against the upper end of the cushion chamber member part 100. As shown, the lower side of the piston 72 abuts the upper end of the stop nut 112. Next, a tubular piston rod sleeve 114 is slipped over the valve stem 44 and lowered until it seats and is sealed in an upwardly open socket 116 coaxially formed in the upper side of the piston 72. Then a piston rod sleeve nut 118 is threaded onto a threaded band on the valve stem 44. An upper stop nut 120 is shown threaded onto the valve stem 44 behind the piston rod sleeve nut.

It should now be noticed that the top wall 68 of the fluid pressure actuated operator housing 62 is coaxially provided with an integral tubular upward extension 122 and that the piston rod sleeve 144 is so located that in its extremes of movement, when the valve stem 44 is raised and lowered, the piston rod sleeve 114 goes from being mostly radially within the chamber 124 provided within the tubular portion 122 and being mostly within the upper compartment 80 of the operator 60.

It should also be noticed that the valve stem 44 has an upper end 126 which lies midway along the axial length of the chamber 124 when the valve stem 44 is in its lower position (shown at the left in FIG. 1b) and is located just axially beyond the upper end of the tubular portion 122 when the valve stem is in its raised position (shown at the right in FIG. 1b). This upper end 126 is provided with an internally threaded upwardly opening socket 128. Some of this structure is an artifact of the evolutionary history of the particular valve shown in FIG. 1b. For instance, the exteriorly threaded upper end of the tubluar extension 122 (if the structure to be described below were not used) could receive a conventional lock-out cap having a central opening through which the indicator stem 130 that is shown threaded into a socket 128 would be visible as a protrusion were the valve in a closed condition. Furthermore, an electrical monitoring device of a conventional type (not shown) could be disposed within the chamber 124 and have an electrical lead therefrom (not shown) exit through the fitting 132 in order to permit monitoring the open/closed condition of the valve from a remote location.

However, in the present instance, the usual lock-out cap has been replaced by a specially designed lock-out cap 134. Details of the lock-out cap 134 and associated structure are shown in more detail in FIG. 2.

In general, the lock-out cap 134 is a tubular member having a longitudinal bore 136 that is internally threaded at both ends. At its lower end the lock-out cap 134 is threaded onto the upper end of the tubular neck 122 so that it forms an axially upward extension of the tubular neck 122. Another upward extension of the valve stem 44, this one called the lock-out stem 138 is shown having a coaxial, downwardly opening socket extending up to about the mid-point thereof. The lock-out stem 138, socket 140 is slipped over the indicator stem 130 and moved downwardly until the lock-out stem 138 abuts and comes to rest upon the upper end of the upper end stop nut 120 and/or the upper end of the valve stem 44.

Below its internally threaded upper end the longitudinal bore 136 of the lock-out cap 134 is provided with an axially short portion of increased radius (compared to the remainder of the bore immediately therebelow) which coaxially provides an annular chamber 142.

It should now be noticed that there is a circumferentially extending notch 144 provided in the exterior of the lock-out stem near the upper end thereof.

When the valve is in its open position, the valve stem 44, its indicator stem 130 and the lock-out stem 138 which is sleeved thereover, collectively are in their lower position as shown at the left in FIG. 1a. In this position, the notch 144 in the lock-out stem 138 is at the same level as the chamber 142.

At least one and preferably several openings are provided through the lock-out cap 134. A plurality of radiating openings 146 are shown. A split ring of elastic hard metal or the like 148 is forcibly contracted using a suitable conventional tool into the notch 144 and a fusible lock-out ring is slipped behind it into the chamber 142. The fusible lock-out ring 150 radially occupies all of the space between the lock-out cap 134 and the retaining ring 148. Accordingly, so long as the fusible lock-out ring 150 remains in place, the split ring 148 remains forcibly contracted into the notch 144 in the lock-out stem 138. These parts are kept from being mechanically dislodged by the installation of an exteriorly threaded annular lock-out gland 152 which is threaded into the upper end of the bore 136 of the lock-out cap 134 until it abuts at least one of the split ring 148 and the fusible lock-out ring 150.

As explained above, with respect to the left side of FIGS. 1a and 1b, the valve 10 is thus locked in an open position. It may remain this way for an indefinitely long period of time, perhaps through its entire useful life.

The valve 10, as equipped in FIGS. 1a and 1b, is designed to be used at a facility where there may be an unexpected and potentially disastrous fire which could be fed by a flammable substance. For instance, the arrangement could be used as part of a petroleum well Christmas tree or to control the transport through pipelines of flammable substances at a petroleum or chemical processing plant. If such a fire were to occur, there would be the danger that if the heat were sufficiently intense for a sufficiently long period of time the packing 94 could become heat damaged and permit flammable liquids or gases escape from the valve between the valve bonnet and stem. However, the structure 134-152, in association with the operator 60 should prevent that from happening, in the following manner. In the heat of the fire, the fusible lock-out ring 150 will melt and the material thereof will run out of the drain openings 146, leaving the split ring 148 free to expand. As the ring 148 expands, it radially clears the notch 144. Then the compression coil springs 76 are free to recover from the compressed condition shown at the left in FIG. 1 to the less compressed, more expanded condition shown at the right in FIGS. 1a and 1b. This cuts off the flow of more potential fuel of the vicinity of the fire and establishes a metal-to-metal seal at 58, 54 that is more resistant to fire damage than would be the packing set 94.

In general, the operator 60 as shown and described is somewhat more elaborate than would be necessary under circumstances as simple as the ones described above. For instance, the only time that the fluid pressure system for moving the piston 72 would need to be employed in the operations as discussed above would be in the initial opening of the valve, incident to installation of the split ring 148, fusible lock-out ring 150, and the lock-out gland 152. Once these latter elements were installed, the pressurized fluid could be allowed to vent at 82 and the inlet fitting 82 closed off. (In other words, there should not be sufficient pressurization left in the upper compartment 80 to prevent the springs 76 from recovering once the fusible lock-out ring 150 had melted out of the way.) However, only a simple situation has been described, for the purpose of making the invention easy to understand by itself. There are other reasons why a user would want to have the fluid pressure actuated operator 60, as shown, incorporated as part of the structure. For instance, one may want to have an opportunity for providing for remote actuation of the valve already installed and ready to be used on physical removal of the gland 152 and the fusible lock-out ring 150. Although that would result in an immediate closing of the valve, unless the upper compartment 80 were adequately pressurized as a preliminary matter, the resulting structure would be susceptible of remote, automatic operation by injection of pressurized fluid into the upper compartment 80 through the inlet fitting 82 in order to open the valve and for the release of that pressurization through the inlet fitting 182 in order to permit the springs 76 to recover and close the valve.

Item 154 is a standard burst disk arrangement which may be provided in the piston 72. Various seals not mentioned above are shown provided at 156.

Figure 2:
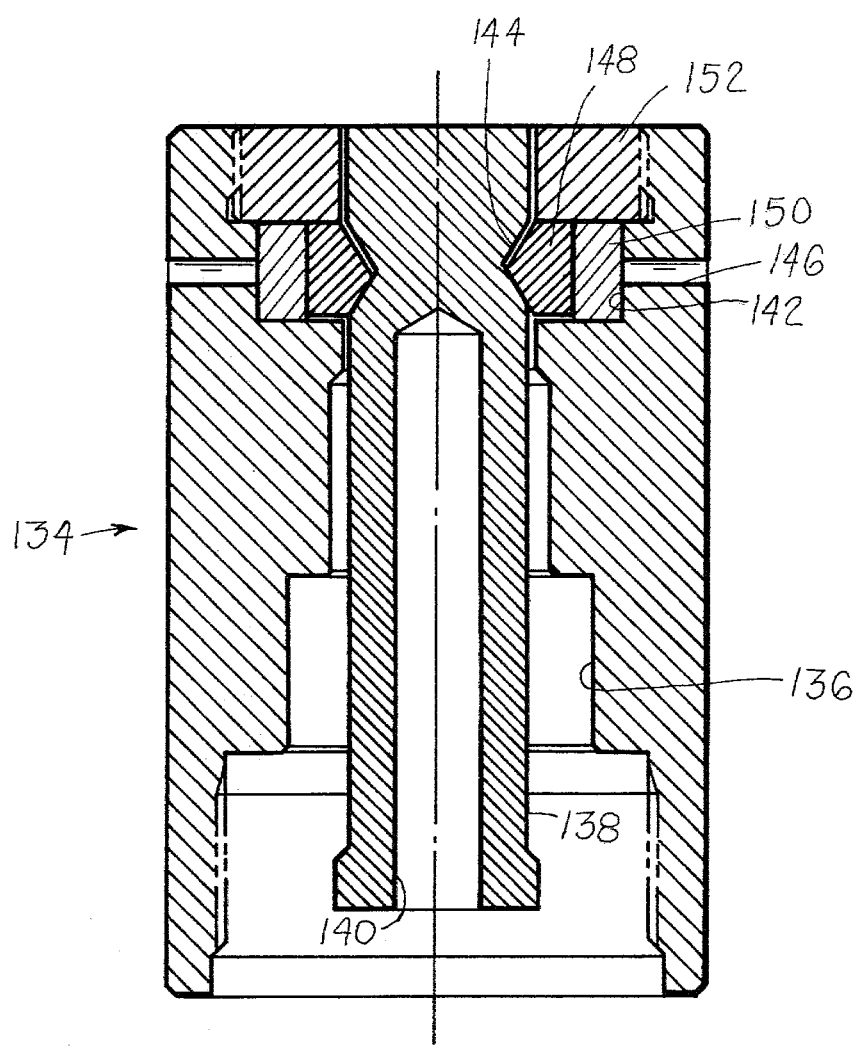
FIG. 2 is a larger scale view of a portion of what is shown in FIG. 1 in order to better illustrate details of the preferred heat responsive back seat arrangement.

The sub-assembly shown in FIG. 2 may be made up ahead of time and installed simply by actuating the valve to its open position, then screwing this lock-out cap 134 sub-assembly into place. It may be removed the same way, as a sub-assembly.

The heat-responsive material of the ring 150 is a fusible, preferably metallic material, e.g. of a composition such as disclosed in the above-mentioned patents of Allen and Wicke. Should a fire or the like occur, such as would likely destroy the stem packing 94, the ring 150 will melt and its molten residue will flow out the ports 146 provided in communication with the site of the body 150 through the cap 134. Then the valve stem will rise, until the back seat is established at 58/54, preventing leakage. Later, the valve may be repaired, if damage is not too great, by the replacement of the packing and of the fusible ring 150, with reassembly as above.

It should now be apparent that the heat responsive back seat arrangement for valve operator as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A heat responsive back seat arrangement for a valve operator, comprising:

valve housing means including valve bonnet means having a bore;

a valve body which reciprocates in one sense to close and reciprocates in an opposite sense to open, said valve body having a rising valve stem connected therewith;

the valve body being enclosed within the valve housing means, with the valve stem passing out through said valve bonnet means bore;

an annular body of axially compressively loaded valve stem packing installed to form a seal between the valve bonnet means and the valve stem, yet permit axial reciprocating movement of the valve stem relative to the valve housing means;

complementary, circumferentially extending back seat, annular sealing surface bearing shoulder means on each of said valve stem and said valve bonnet means in said bore of the latter, the two respective annular sealing surfaces being disposed on their respective parts to form an extensive, surface-to-surface circumferential seal between the valve bonnet means and the valve stem only when said valve stem is reciprocated to one resultingly-defined extreme of axial movement relative to said valve housing means;

a valve operator located relatively exteriorly of said valve housing compared to said valve body by being separable therefrom by said back seat;

said valve operator including normally-cocked force-storage means effectively interposed between said valve stem and said valve housing means to, when released, axially move said valve stem to said one extreme thus making said circmferential seal of said back seat; and lock-out means normally effectively interposed between said valve stem and said valve housing means, normally locking said valve stem in a resultingly-defined axially opposite extreme thereof, in which said annular sealing surfaces are axially spaced from one another and are not in circumferential sealing engagement, and in which said force-storage means is resultingly normally cocked;

the lock-out means including a thermally fusible element effectively interposed between said valve stem and said valve housing means which, in the absence of subjection to a preselected abnormally high temperature level remains an effective mechanical bridge therebetween , but which, when subjected to said preselected abnormally high temperature level softens and becomes ineffective as a mechanical bridge, thereby releasing said normally-cocked force-storage means, to axially move said valve stem to said one extreme thus making said circumferential seal of said back seat;

said lock-out means further including:

a radially outwardly opening notch in said valve stem;

a locking dog means normally forced partway into said notch;

force-storage means associated with said locking dog means, and tending to withdraw said locking dog means from said notch; and said thermally fusible element being constituted by a block of heat-fusible material normally effectively interposed between said locking dog means and said valve housing means, so that when said block softens due to being heated and tends to lose interposition effectiveness, said force-storage means associated with said locking dog means releases force stored therein and said locking dog means withdraws from said notch, freeing said valve stem to axially move toward said axially opposite extreme;

said valve stem being divided into a plurality of stem segments connected end-to-end, and including an axially outermost lock-out stem which is telescopically related to the remainder of said valve stem, said notch being provided in said lock-out stem; and said valve housing means being divided into a plurality of housing portions including:

a main portion in which said valve body is chambered, said valve bonnet, surmounting said main portion, an operator housing surmounting said valve bonnet and containing said normally-cocked force-storage means, and a lock-out cap surmounting said operator housing;

said lock-out cap being generaly tubular so as to have a throughbore;

means defining a recess in the lock-out cap throughbore intermediate the ends thereof;

said locking dog means to the extent said locking dog means is not disposed within said notch, said force-storage means associated therewith, and said block of heat-fusible material normally being disposed in said recess;

the locking dog means and the force-storage means associated therewith being jointly constituted by a forcibly resiliently radially contracted, self-expansible split retainer ring;

said block of heat fusible material being constituted by an annulus thereof which normally circumferentially surrounds said locking dog means;

a plurality of drain hole openings provided through the valve housing and into communication with said annulus of heat fusible material.

2. The heat responsive back seat arrangement of claim 1, wherein:

the valve housing includes a throughbore having said valve body as a control element therefor, so that when said valve stem is disposed in said one axial extreme, said throughbore is blocked by said valve body and when said valve stem is disposed in said opposite axial extreme, said throughbore is open past said valve body.

3. The heat responsive back seat arrangement of claim 2, wherein:

the valve body is a valve gate means.

4. The heat responsive back seat arrangement of claim 1, wherein:

said normally-cocked force-storage means is constituted by at least one compression coil spring.

5. The heat responsive back seat arrangement of claim 1, further comprising:

a threaded, disconnectably connected joint between said lock-out cap and the remainder of said valve housing means, so that said split retainer ring, annulus of heat-fusible material, lock-out stem and lock-out cap may be installed, removed and replaced as a preassembled sub-assembly.

6. A heat responsive back seat arrangement for a valve operator, comprising:

valve housing means including valve bonnet means having a bore;

a valve body which reciprocates in one sense to close and reciprocates in an opposite sense to open, said valve body having a rising valve stem connected therewith;

the valve body being enclosed within the valve housing means, with the valve stem passing out through said valve bonnet means bore;

an annular body of axially compressively loaded valve stem packing installed to form a seal between the valve bonnet means and the valve stem, yet permit axial reciprocating movement of the valve stem relative to the valve housing means;

complementary, circumferentially extending back seat, annular sealing surface bearing shoulder means on each of said valve stem and said valve bonnet means in said bore of the latter, the two respective annular sealing surfaces being disposed on their respective parts to form an extensive, surface-to-surface circumferential seal between the valve bonnet means and the valve stem only when said valve stem is reciprocated to one resultingly-defined extreme of axial movement relative to said valve housing means;

a valve operator located relatively exteriorly of said valve housing compared to said valve body by being separable therefrom by said back seat;

said valve operator including normally-cocked force-storage means effectively interposed between said valve stem and said valve housing means to, when released, axially move said valve stem to said one extreme thus making said circumferential seal of said back seat; and lock-out means normally effectively interposed between said valve stem and said valve housing means, normally locking said valve stem in a resultingly-defined axially opposite extreme thereof, in which said annular sealing surfaces are axially spaced from one another and are not in circumferential sealing engagement, and in which said force-storage means is resultingly normally cocked;

the lock-out means including a thermally fusible element effectively interposed between said valve stem and said valve housing means which, in the absence of subjection to a preselected abnormally high temperature level remains an effective mechanical bridge therebetween, but which, when subjected to said preselected abnormally high temperature level softens and becomes ineffective as mechanical bridge, thereby releasing said normally-cocked force-storage means, to axially move said valve stem to said one extreme thus making said circumferential seal of said back seat;

said lock-out means further including:
a radially outwardly opening notch in said valve stem;
a locking dog means normally forced partway into said notch;
force-storage means associated with said locking dog means, and tending to withdraw said locking dog means from said notch; and
said thermally fusible element being constituted by a block of heat-fusible material normally effectively interposed between said locking dog means and said valve housing means, so that when said block softens due to being heated and tends to lose interposition effectiveness, said force-storage means associated with said locking dog means releases force stored therein and said locking dog means withdraws from said notch, freeing said valve stem to axially move toward said axially opposite extreme;

said valve stem being divided into a plurality of stem segments connected end-to-end, and including an axially outermost lock-out stem which is telescopically related to the remainder of said valve stem, said notch being provided in said lock-out stem; and said valve housing means being divided into a plurality of housing portions including:
a main portion in which said valve body is chambered,
said valve bonnet, surmounting said main portion,
an operator housing surmounting said valve bonnet and containing said normally-cocked force-storage means, and
a lock-out cap surmounting said operator housing said lock-out cap being generally tubular so as to have a throughbore;

means defining a recess in the lock-out cap throughbore intermediate the ends thereof;

said locking dog means to the extent said locking dog means is not disposed within said notch, said force-storage means associated therewith, and said block of heat-fusible material normally being disposed in said recess;

the locking dog means and the force-storage means associated therewith being jointly constituted by a forcibly resiliently radially contracted, self-expansible split retainer ring;

said block of heat-fusible material being constituted by an annulus thereof which normally circumferentially surrounds said locking dog means;

a threaded, disconnectably connected joint between said lock-out cap and the remainder of said valve housing means, so that said split retainer ring, annulus of heat-fusible material, lock-out stem and lock-out cap may be installed, removed and replaced as a pre-assembled sub-assembly;

said lock-out cap throughbore includes a mechanical securement feature axially outwardly beyond the annulus of heat-fusible material; and an annular lock-out gland removably secured in said throughbore, said lock-out gland having an opening centrally thereof for passing said lock-out stem;

said lock-out gland axially confronting both of, and axially abutting at least one of, said mechanical securement feature and said annulus of heat-fusible material.

7. The heat responsive back seat arrangement of claim 6, wherein:
said mechanical securement feature is constituted by cooperating screw threading on said lock-out cap and on said lock-out gland.

8. For a valve having an operator for axially moving a valve stem thereof, which operator includes a housing having a tubular extension into which an end portion of the valve stem protrudes to a lesser and greater degree depending upon the current status of axial disposition of the valve stem,
a fusible lock-out cap arrangement for maintaining the valve stem below an upper extreme of axial movement thereof under pre-selected normal conditions of subjection of the valve operator to heat, said fusible lock-out cap arrangement including:

a lock-out stem segment having means for physically telescoping with said end portion of said valve stem;

a radially outwardly opening notch in said lock-out stem segment;

a tubular lock-out cap having a throughbore provided with a recess therein;

a locking dog means normally forced part-way into said notch;

force-storage means associated with said locking dog means, and tending to withdraw said locking dog means from said notch;

a thermally fusible element being constituted by a block of heat-fusible material normally effectively interposed between said locking dog means and said tubular lock-out cap, within said recess in said throughbore thereof, so that when said block softens due to being heated and tends to lose interposition effectiveness, said force-storage means associated with said locking dog means releases force stored therein and said locking dog means withdraws from said notch, freeing said valve stem to axially move to said upper extreme of axial movement thereof;

means for removably connecting said tubular lock-out cap on said tubular extension of said operator as a coaxial extension thereof;

the locking dog means and the force-storage means associated therewith being jointly constituted by a forcibly resiliently radially contracted, self-expansible split retainer ring;

said block of heat-fusible material being constututied by an annulus thereof which normally circumferentially surrounds said locking dog means;

a plurality of drain hole openings provided through the lock-out cap and into communication with said annulus of heat-fusible material.

9. The fusible lock-out cap arrangement of claim 8, in which there is a band of screw threading on said tubular extension of said operator, and wherein:

said removably connecting means is constituted by a band of screw threading on said tubular lock-out cap for cooperative threaded engagement with the band of screw threading on said tubular extension of said operator.

10. The fusible lock-out cap arrangement of claim 8, wherein:

said lock-out cap throughbore includes a mechanical securement feature axially outwardly beyond the annulus of heat-fusible material; and an annular lock-out gland removably secured in said throughbore, said lock-out gland having an opening centrally thereof for passing said lock-out stem.

11. The fusible lock-out cap arrangement of claim 10, wherein:

said mechanical securement feature is constituted by cooperating screw threading on said lock-out cap and on said lock-out gland.

* * * * *